(12) United States Patent
Hardee et al.

(10) Patent No.: US 11,528,513 B2
(45) Date of Patent: Dec. 13, 2022

(54) PREEMPTIVELY ALTERING ADVERTISING CONTENT

(71) Applicant: International Business Machines Corporation, Armonk, NY (US)

(72) Inventors: Christopher J. Hardee, Raleigh, NC (US); Steven Joroff, River Vale, NJ (US); Scott E. Schneider, Rolesville, NC (US); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/109,732

(22) Filed: Dec. 2, 2020

(65) Prior Publication Data

US 2022/0174336 A1    Jun. 2, 2022

(51) Int. Cl.
*H04N 21/234* (2011.01)
*H04N 21/81* (2011.01)
*H04N 21/442* (2011.01)
*H04N 21/24* (2011.01)

(52) U.S. Cl.
CPC ... *H04N 21/23424* (2013.01); *H04N 21/2407* (2013.01); *H04N 21/44218* (2013.01); *H04N 21/812* (2013.01)

(58) Field of Classification Search
CPC ......... H04N 21/23424; H04N 21/2407; H04N 21/812; H04N 21/44218; G06F 3/013
USPC .......................................................... 725/12
See application file for complete search history.

(56) References Cited

U.S. PATENT DOCUMENTS

| 8,468,056 | B1   | 6/2013 | Chalawsky |
| 8,625,974 | B1 * | 1/2014 | Pinson ................... H04N 5/783 386/350 |
| 8,997,150 | B2   | 3/2015 | Kilar |
| 9,009,066 | B2   | 4/2015 | Long |
| 9,237,294 | B2   | 1/2016 | Candelore |
| 2003/0149621 | A1 * | 8/2003 | Shteyn ............... G06Q 30/0272 705/14.68 |
| 2004/0103429 | A1 * | 5/2004 | Carlucci .......... H04N 21/44016 725/32 |
| 2007/0074243 | A1 * | 3/2007 | Verhaegh ............. H04N 21/812 725/35 |

(Continued)

FOREIGN PATENT DOCUMENTS

WO    2008088510 A1    7/2008

OTHER PUBLICATIONS

J. Kim and J. Kim, "Video viewer state estimation using gaze tracking and video content analysis," 2013 Visual Communications and Image Processing (VCIP), 2013, pp. 1-6, doi: 10.1109/VCIP. 2013.6706365. (Year: 2013).*

(Continued)

*Primary Examiner* — Cynthia M Fogg
(74) *Attorney, Agent, or Firm* — Alexander G. Jochym (57) ABSTRACT

A media being consumed on a computing device is determined. Responsive to determining the media is being consumed, a first video is presented on the computing device. The first video is an advertisement. A user is going to skip the first video is determined. Responsive to determining the user is going to skip the first video, a second video is presented on the computing device. The second video is an advertisement.

6 Claims, 3 Drawing Sheets

(56) References Cited

U.S. PATENT DOCUMENTS

| | | | | |
|---|---|---|---|---|
| 2008/0109840 A1* | 5/2008 | Walter | | H04N 21/6125 |
| | | | | 348/E7.071 |
| 2008/0313668 A1 | 12/2008 | Setos | | |
| 2009/0106785 A1* | 4/2009 | Pham | | H04N 21/4667 |
| | | | | 725/32 |
| 2009/0300699 A1* | 12/2009 | Casagrande | | H04N 5/76 |
| | | | | 725/116 |
| 2010/0269128 A1* | 10/2010 | Gordon | | H04N 7/17318 |
| | | | | 725/25 |
| 2011/0179448 A1* | 7/2011 | Karaoguz | | H04N 21/812 |
| | | | | 725/34 |
| 2011/0219400 A1 | 9/2011 | Candelore | | |
| 2013/0050432 A1* | 2/2013 | Perez | | G06F 3/017 |
| | | | | 348/47 |
| 2013/0340006 A1* | 12/2013 | Kwan | | H04N 21/6547 |
| | | | | 725/39 |
| 2016/0225012 A1* | 8/2016 | Ha | | G06Q 30/0277 |
| 2017/0188116 A1* | 6/2017 | Major | | H04N 21/812 |
| 2017/0289641 A1* | 10/2017 | Patel | | G11B 27/102 |
| 2018/0349945 A1* | 12/2018 | Jayaraman | | G06Q 30/0277 |
| 2020/0045363 A1* | 2/2020 | Nellore | | H04N 21/812 |
| 2021/0211748 A1* | 7/2021 | Terem | | H04N 21/6581 |

OTHER PUBLICATIONS

S. Patil, Y. Chen and T. S. Rosing, "GazeTube: Gaze-Based Adaptive Video Playback for Bandwidth and Power Optimizations," 2015 IEEE Global Communications Conference (GLOBECOM), 2015, pp. 1-6, doi: 10.1109/GLOCOM.2015.7417405. (Year: 2015).*

Disclosed Anonymously et al, "Method and System for Controlling Skipping of Advertisements in a Video", IP.com Prior Art Database Technical Disclosure, IPCOM000200486D, Oct. 15, 2010, pp. 1-3.

* cited by examiner

PREEMPTIVELY ALTERING ADVERTISING CONTENT

BACKGROUND

The present invention relates generally to the field of media advertising, and more particularly to preemptively altering advertising content during consumption of media by a user.

Online content, especially streaming content, often includes advertisements at the beginning or during the middle of the streaming content. Many advertising platforms include an advertisement that is displayed, and the user must have the advertisement on the screen for a set period of time before the user may indicate to skip the remainder of the advertisement and move on to the media they intended to originally consume.

SUMMARY

Embodiments of the present invention include a computer-implemented method, computer program product, and system for altering content. In an embodiment, a media being consumed on a computing device is determined. Responsive to determining the media is being consumed, a first video is presented on the computing device. The first video is an advertisement. A user is going to skip the first video is determined. Responsive to determining the user is going to skip the first video, a second video is presented on the computing device. The second video is an advertisement.

DETAILED DESCRIPTION

The present invention provides a method, computer program product, and computer system for altering advertising content. Embodiments of the present invention recognize advertisement are a part of online media content. Embodiments of the present invention recognize that many advertising platforms provide options for advertisement displaying, including the ability to skip the advertisement after waiting a set period of time. Embodiments of the present invention provide for a program to determine a user is about to skip an advertisement and then altering and/or replacing the content of the advertisement prior to the user performing the skip action.

As used herein, the term to "skip" or "skipped" includes, but is not limited to, interrupting, pausing, ending or any other form of modification to the playing of a piece of media or multimedia. For example, a user may "skip" an advertisement by interacting with a button on the user interface of the computing device. In another example, a user may "skip" an advertisement when viewing a first piece of multimedia in a first window of a web browser and then interacting with a second window of the same or a different web browser. In yet another example, a user may "skip" an advertisement when viewing a first piece of multimedia in a web browser and then interacting with another program on the user interface of the computing device.

As used herein, the term "media" or "multimedia" may be, but is not limited to, any form or combination of audio, video, images, etc. For example, "media" or "multimedia" may be a video advertisement of a product. In another example, "media" or "multimedia" may be an animated gif that is a collection of still images. In yet another example, "media" or "multimedia" may be solely audio or audio associated with an image and/or video.

Figure 1:
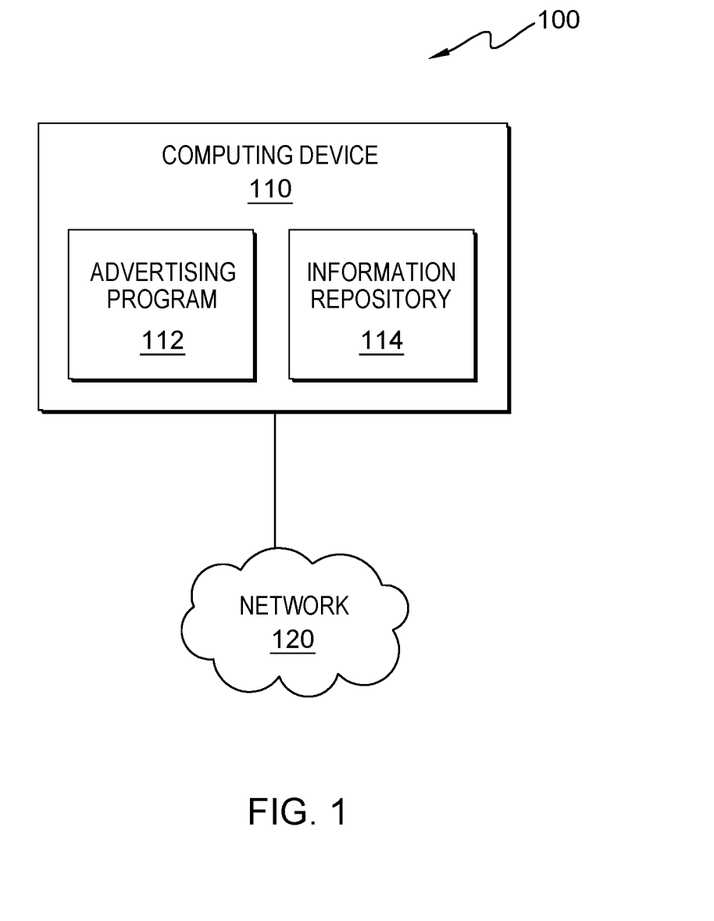
FIG. 1 is a functional block diagram of a network computing environment, generally designated 100, suitable for operation of advertising program 112, in accordance with at least one embodiment of the invention.

Referring now to various embodiments of the invention in more detail, FIG. 1 is a functional block diagram of a network computing environment, generally designated 100, suitable for operation of advertising program 112 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In various embodiments of the invention, computing device 110 includes advertising program 112 and information repository 114.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes advertising program 112. Embodiments of the present invention provide for an advertising program 112 determines the media to be consumed. In embodiments of the present invention, advertising program 112 presents an advertisement before or during the media. In embodiments of the present invention, advertising program 112 determines whether the advertisement is about to be skipped. In embodiments of the present invention, advertising program 112 determines an alternative advertisement. In embodiments of the present invention, advertising program 112 presents the alternative advertisement. In embodiments of the present invention, advertising program 112 determines whether the user skips the advertisement. In embodiments of the present invention, advertising program 112 ends the advertisement. In embodiments of the present invention, advertising program 112 finishes the advertisement.

In an embodiment, computing device 110 includes information repository 114. In an embodiment, information repository 114 may be managed by advertising program 112. In an alternative embodiment, information repository 114 may be managed by the operating system of computing device 110, another program (not shown), alone, or together with, advertising program 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. In an embodiment, some information found in information repository 114 may be hard coded in advertising program 112. Information repository 114 may include, but is not limited to, gaze time thresholds, pointer location time thresholds, threshold pointer distance, hover time thresholds, hover location distance, audio threshold, advertisement information including advertising skip time, alternate advertisement information, etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

As referred to herein, all data retrieved, collected, and used, is used in an opt-in manner, i.e., the data provider has given permission for the data to be used. For example, the received data received and used by advertising program 112 to determine gazing, hovering, pointer location, and/or advertising information.

Figure 2:
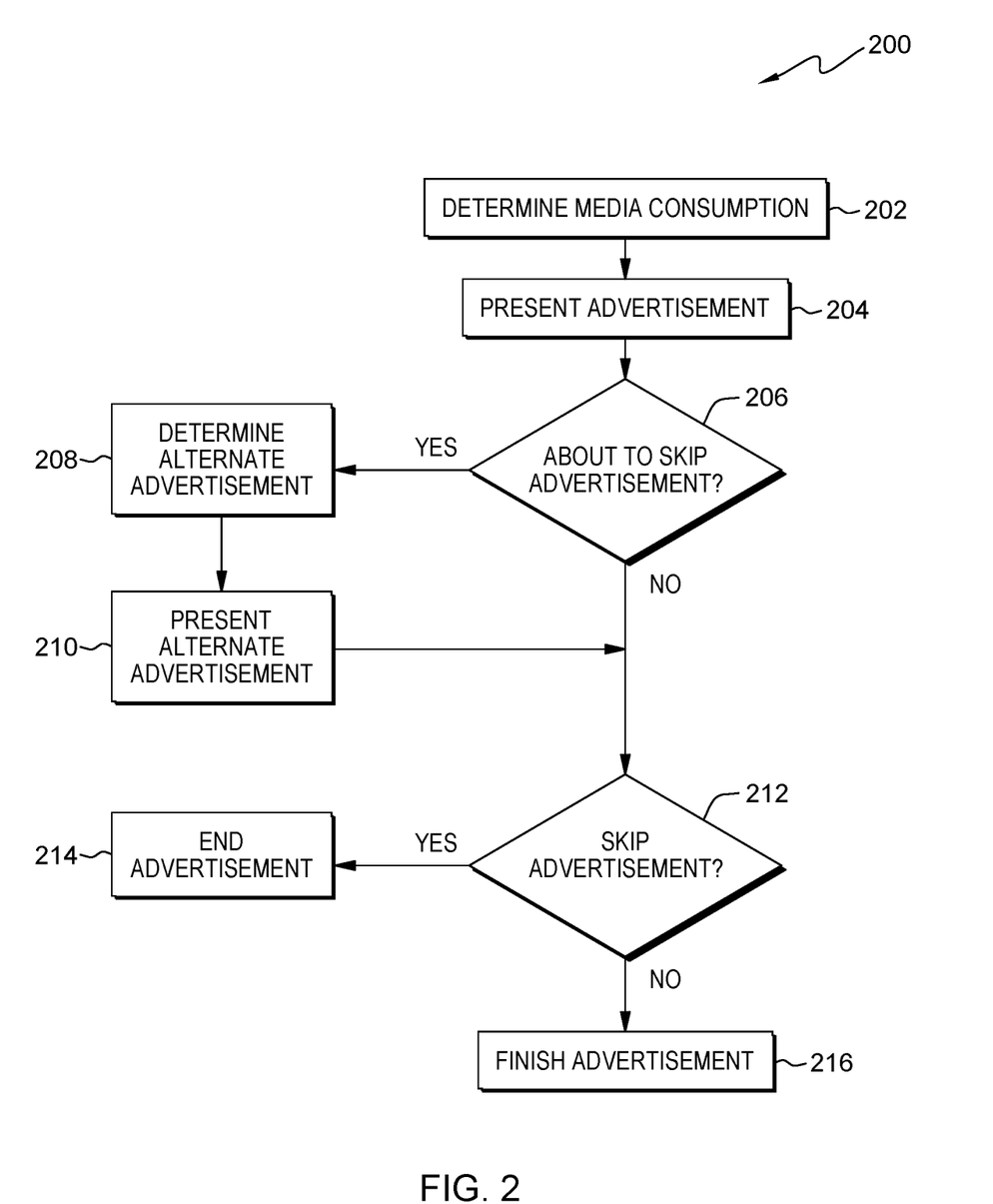
FIG. 2 is a flow chart diagram depicting operational steps for advertising program 112 for altering advertising content, in accordance with at least one embodiment of the invention.

FIG. 2 is a flow chart diagram of workflow 200 depicting operational steps for advertising program 112 in accordance with at least one embodiment of the invention. In an alternative embodiment, the steps of workflow 200 may be performed by any other program while working with advertising program 112. It should be appreciated that embodiments of the present invention provide at least for altering advertising content. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. For example, a user may be consuming media on a mobile computing device (not shown) and the mobile computing device interacts with advertising program 112 found on computing device 110 via network 120 to perform the steps of workflow 200. In a preferred embodiment, a user, via a user interface (not shown), can invoke workflow 200 upon a user wanting advertising program 112 to determine alternate advertising content. In an embodiment, the advertisement may be any form of media or multimedia, as discussed above.

Advertising program 112 determines media consumption (step 202). At step 202, advertising program 112 determines that media is being consumed on computing device 110. In an embodiment, advertising program 112 may display media on computing device 110 and therefore determine that media is being consumed on computing device 110. In alternative embodiment, advertising program 112 receives an indication from another program (e.g., operating system, web browser, media player, etc.) that media is being consumed on computing device 110. In an embodiment, "consuming" media means that the media is being displayed on the display of computing device 110 for use by a user. In an embodiment, the media may be audio, visual, or any combination thereof. For example, a user may use a web browser to view a website that displays a video with audio that streams through the internet.

Advertising program 112 presents an advertisement (step 204). At step 204, advertising program 112 presents an advertisement for consumption either before or during the consumption of the determined media in step 202. In an embodiment, advertising program 112 may display the advertising on computing device 110 and therefore determine that the advertising is being consumed before or during the media being consumed on computing device 110. In an alternative embodiment, advertising program 112 may receive indication from another program (e.g., operating system, web browser, media player, etc.) that the advertising is being presented before or during the media that is being consumed on computing device 110. In an embodiment, the advertisement may be audio, visual, or any combination thereof. In an embodiment, the advertising will last for set period of time (the length of the advertisement) and also have an advertisement skip period of time (the length of time before a user may indicate to skip the advertisement.

Advertising program 112 determines whether the advertisement is about to be skipped (decision step 206). At decision step 206, advertising program 112 determines whether a user, via their actions in both the physical space and/or on the computing device, is going to click on an indication skip the advertisement after the skip period of time but before the entire time of the advertisement. If advertising program 112 determines the user is about to skip the advertisement (decision step 206, yes branch), processing proceeds to step 208. If advertising program 112 does not determine the user is about the skip the advertisement, processing proceeds to step 212. In decision step 206, the first embodiment, second embodiment, third embodiment, and fourth embodiment, discussed below, may be each used by themselves or in any combination together in order to determine whether an advertisement is about to be skipped.

In a first embodiment, advertising program 112 may receive a video view from a video device (not shown) and using the gaze of the user, location of the user and the location of computing device 110, advertising program 112 can determine a gaze time the user is looking at the graphical interface button for skipping the advertisement when the skip period of time is over. In the first embodiment, advertising program 112 alternatively can determine a gaze time is the time the user is looking away from the direction of computing device 110. In the first embodiment, advertising program 112 alternatively can determine a gaze time is the time the user is looking at a position on the user interface of computing device 110 that is not displaying the media and/or advertisement. In the first embodiment, advertising program 112 alternatively can determine a gaze time is the time the user is looking at another program (not shown) from the one displaying the media and/or advertisement. For example, if a user was watching a video in a first web browser and an advertisement was displayed and the user looks at a second web browser on the user interface. In the first embodiment, if advertising program 112 determines the user has a gaze time equal to or greater than the gaze time threshold then advertising program 112 determines the user is about to skip the advertisement.

In a second embedment, advertising program 112 may determine a location of a pointer on the user interface and determine the pointer time, which is the amount of time the pointer spends in the area of the graphical interface button for skipping the advertisement when the skip period of time is over. In this second embodiment, the pointer time may be the time the pointer is directly within the graphical interface button for skipping. In this second embodiment, the pointer time may be the time the pointer is within a threshold pointer distance of the graphical interface button for skipping. In the second embodiment, if advertising program 112 determines the user has a pointer time equal to or greater than the pointer location time threshold then advertising program 112 determines the user is about to skip the advertisement. Alternatively, in this second embodiment, the pointer time may be a time the pointer is moving towards the graphical interface button for skipping the advertisement when the skip period of time is over.

In a third embodiment, advertising program 112 may receive a video view from a video device (not shown) and using the hand location of the user and the location of computing device 110 or any input device (not shown), for example a mouse or trackpad, advertising program 112 can determine a hover time the hand and/or finger of the user is located over the physical device used for providing an indication to advertising program 112 or any other for skipping the advertisement when the skip period of time is over. In an embodiment, the hover time may be the time the user is in direct contact with the physical device used for providing the indication. In an embodiment, the hover time may be the time the user is within a hover location distance of the physical device used for providing the indication. In the third embodiment, if advertising program 112 determines the user has a hover time equal to or greater than the hover time threshold then advertising program 112 determines the user is about to skip the advertisement. Alternatively, in this third embodiment, the hover time may be a time the hand of the user is moving towards the physical device used for providing an indication for skipping the advertisement when the skip period of time is over.

In a fourth embodiment, advertising program 112 may receive audio, either just an audio stream from a microphone (not shown) or audio attached to a video view from a video device (not shown) and using natural language processing, advertising program 112 can determine whether words and phrases are being used that may indicate the advertisement is about to skip. In the fourth embodiment, if advertising program 112 determines, using that natural language processing, that the words and/or phrases create an audio number (for example, the use of the word "skip" in the audio is a high score and the use of "love this advertisement" is a low score) higher than the audio threshold then advertising program 112 determines the user is about to skip the advertisement.

Advertising program 112 determines alternate advertisement (step 208). At step 208, advertising program 112 determines an alternative advertisement to replace the advertisement displayed in step 204. In an embodiment, advertising program 112 determines an alternate advertisement from information repository 114. In an embodiment, when a user, such as a company, submits an advertisement they may also submit alternate advertisements that are stored in information repository 114 or any other location accessible to advertising program 112. In an embodiment, the alternate advertisement may be a static image. For example, if the advertisement presented in step 204 is for Company A, then the static image may be the logo of Company A. In an embodiment, the alternate advertisement may be determined by advertising program 112 determining the remaining time before the user may skip the advertisement, and taking the amount of remaining time and fast forward the current advertisement from step 204 so that the current advertisement will end at the time the skip is available to the user. In an embodiment, alternate advertising may another video that the user, when submitting an advertisement that is displayed in step 204, indicates as the replacement video to be used as the alternate advertisement. In an embodiment, advertising program 112 may determine the alternate advertisement based on information about the user by using typical and personalized advertising approach known in the art to determine other advertisement that may be less likely to be skipped by the user. In an alternative embodiment, advertising program 112 may determine the alternate advertisement is one that has been skipped below a threshold amount based on previous uses of advertising program 112.

Advertising program 112 presents an alternate advertisement (step 2010). At step 210, advertising program 112 presents an alternate advertisement for consumption either before or during the consumption of the determined media in step 202 that is to replace the advertisement presented in step 204. In an embodiment, the alternate advertisement that is presented is determined in step 208. In an embedment, the alternate advertisement may be audio, visual, or any combination thereof. In an embodiment, the advertising will last for set period of time (the length of the advertisement) and also have an advertisement skip period of time (the length of time before a user may indicate to skip the advertisement which is the same as the times of the previously presented advertisement. In other words, the skip time and total play time are not reset, but use the remaining skip time and play time of the advertisement presented in step 204.

Advertising program 112 determines whether to skip the advertisement (decision step 212). At step 212, advertising program 112 determines whether an indication was received to skip the advertisement after the advertisement skip period time. In an embodiment, the indication may be made by a user using a physical device (not shown) attached to computing device. For example, via a mouse or audible indication. In an embodiment, if an indication is received to skip the advertisement (decision step 212, "yes" branch), processing proceeds to step 214. In an embodiment, if an indication is not received to skip the advertisement (decision step 212, "no" branch), processing proceeds to step 216.

Advertising program 112 ends the advertisement (step 214). At step 214, advertising program 112 ends displayed the advertisement, either the advertisement from step 204 or the alternate advertisement from step 210, and then displays the media for consumption in step 202. In an embodiment, advertising program 112 may work with another program (e.g., operating system, web browser, media player, etc.) to display the media. In an embodiment, the media being displayed may start at the beginning. In an alternative embodiment, where an advertisement is displayed in the middle of the piece of media, the media is displayed at the point where the media stopped to display the advertisement.

Advertising program 112 finishes the advertisement (step 216). At step 216, advertising program 112 finishes displaying the advertisement, either the advertisement from step 204 or the alternate advertisement from step 210, and then displays the media for consumption in step 202. In an embodiment, advertising program 112 may work with another program (e.g., operating system, web browser, media player, etc.) to display the media. In an embodiment, the media being displayed may start at the beginning. In an alternative embodiment, where an advertisement is displayed in the middle of the piece of media, the media is displayed at the point where the media stopped to display the advertisement.

Figure 3:
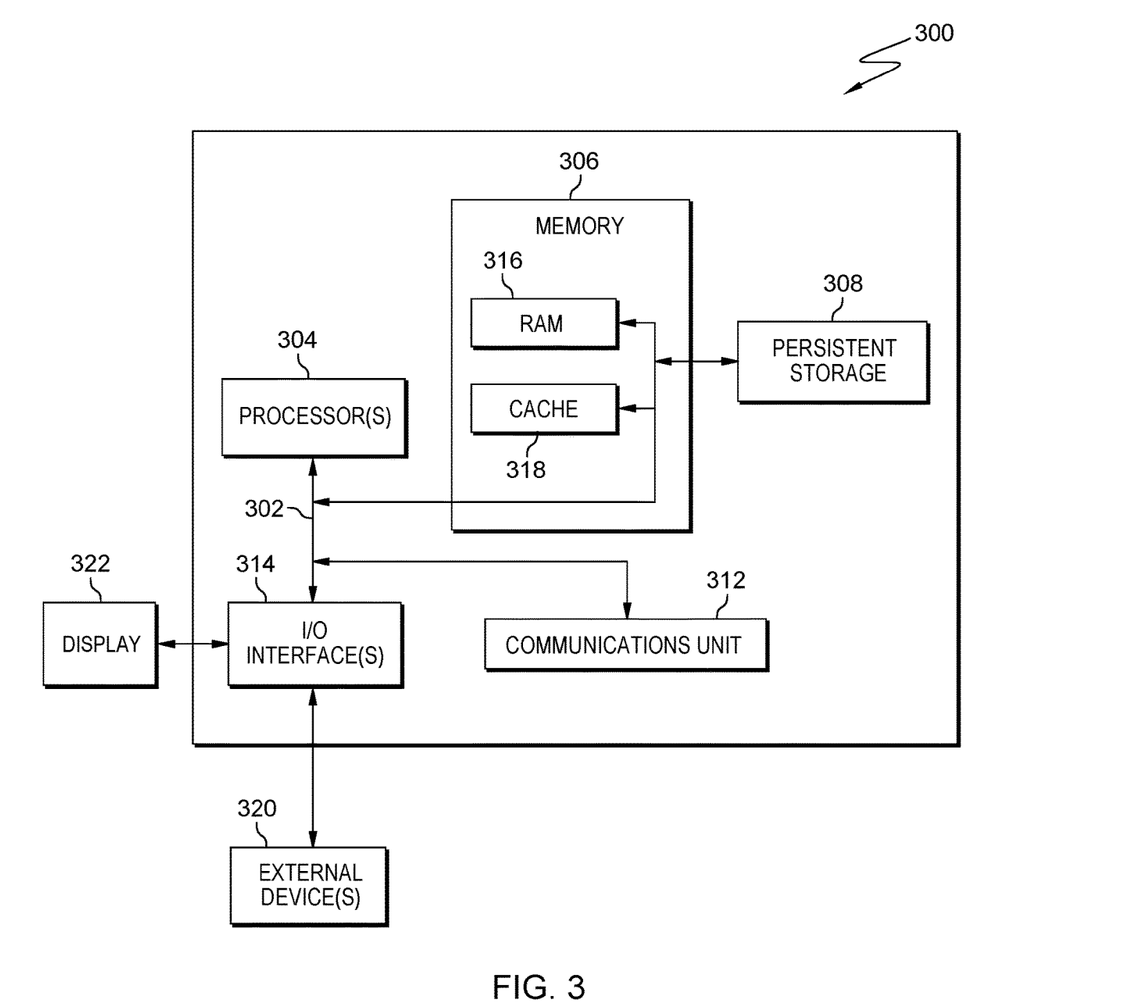
FIG. 3 is a block diagram depicting components of a computer, generally designated 300, suitable for executing advertising program 112, in accordance with at least one embodiment of the invention.

FIG. 3 is a block diagram depicting components of a computer 300 suitable for advertising program 112, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for advertising program 112 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for altering content, the computer-implemented method comprising:
    determining, by one or more computer processors, a media being consumed on a computing device;

responsive to determining the media is being consumed, presenting, by one or more computer processors, a first multimedia on the computing device, wherein the first multimedia is an advertisement;

receiving, by one or more computer processors, a video of the user;

determining, by one or more computer processors, a gaze time of the user, wherein the gaze time is when the user is looking at a graphical interface button on the computing device for skipping the first multimedia;

determining, by one or more computer processors, the gaze time is greater than a gaze time threshold;

responsive to determining the gaze time is greater than the gaze time threshold, determining, by one or more computer processors, the user is going to skip the first multimedia; and responsive to determining the user is going to skip the first multimedia, presenting, by one or more computer processors, a second multimedia in place of the first multimedia on the computing device, wherein the second multimedia is an advertisement and wherein the second advertisement is presented in a remaining play time of the first advertisement.

2. The computer-implemented method of claim 1, wherein the first multimedia is a video and the second multimedia is a static image.

3. A computer program product for altering content, the computer program product comprising:

one or more computer readable storage media; and program instructions stored on the one or more computer readable storage media, the program instructions comprising:

program instructions to determine a media being consumed on a computing device;

responsive to determining the media is being consumed, program instructions to present a first multimedia on the computing device, wherein the first multimedia is an advertisement;

program instructions to receive a video of the user;

program instructions to determine a gaze time of the user, wherein the gaze time is when the user is looking at a graphical interface button on the computing device for skipping the first multimedia;

program instructions to determine the gaze time is greater than a gaze time threshold;

responsive to determining the gaze time is greater than the gaze time threshold, program instructions to determine, by one or more computer processors, the user is going to skip the first multimedia; and responsive to determining the user is going to skip the first multimedia, program instructions to present a second multimedia in place of the first multimedia on the computing device, wherein the second multimedia is an advertisement and wherein the second advertisement is presented in a remaining play time of the first advertisement.

4. The computer program product of claim 3, wherein the first multimedia is a video and the second multimedia is a static image.

5. A computer system for altering content, the computer system comprising:

one or more computer processors;

one or more computer readable storage media; and program instructions, stored on the one or more computer readable storage media for execution by at least one of the one or more computer processors, the program instructions comprising:

program instructions to determine a media being consumed on a computing device;

responsive to determining the media is being consumed, program instructions to present a first multimedia on the computing device, wherein the first multimedia is an advertisement;

program instructions to receive a video of the user;

program instructions to determine a gaze time of the user, wherein the gaze time is when the user is looking at a graphical interface button on the computing device for skipping the first multimedia;

program instructions to determine the gaze time is greater than a gaze time threshold;

responsive to determining the gaze time is greater than the gaze time threshold, program instructions to determine, by one or more computer processors, the user is going to skip the first multimedia; and responsive to determining the user is going to skip the first multimedia, program instructions to present a second multimedia in place of the first multimedia on the computing device, wherein the second multimedia is an advertisement and wherein the second advertisement is presented in a remaining play time of the first advertisement.

6. The computer system of claim 5, wherein the first multimedia is a video and the second multimedia is a static image.

* * * * *